(12) United States Patent
Bruno et al.

(10) Patent No.: US 7,467,318 B2
(45) Date of Patent: Dec. 16, 2008

(54) ADAPTIVE TEMPERATURE DEPENDENT FEEDBACK CLOCK CONTROL SYSTEM AND METHOD

(75) Inventors: John Bruno, Scarborough (CA); Oleksandr Khodorkovsky, North York (CA); Erwin Pang, Richmond Hill (CA); Gia Phan, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 236 days.

(21) Appl. No.: 10/675,525

(22) Filed: Sep. 29, 2003

(65) Prior Publication Data

US 2005/0071705 A1 Mar. 31, 2005

(51) Int. Cl.
*G06F 1/04* (2006.01)
(52) U.S. Cl. ...................................... 713/500; 713/322
(58) Field of Classification Search ......... 713/300–340, 713/500–601; 345/501–522
See application file for complete search history.

(56) References Cited

U.S. PATENT DOCUMENTS

| | | | | |
|---|---|---|---|---|
| 5,451,892 | A * | 9/1995 | Bailey | 327/113 |
| 5,490,059 | A * | 2/1996 | Mahalingaiah et al. | 700/46 |
| 5,630,110 | A * | 5/1997 | Mote, Jr. | 713/501 |
| 5,940,786 | A * | 8/1999 | Steeby | 702/132 |
| 5,961,215 | A | 10/1999 | Lee et al. | |
| 6,397,343 | B1 * | 5/2002 | Williams et al. | 713/501 |
| 6,460,125 | B2 | 10/2002 | Lee et al. | |
| 6,484,265 | B2 * | 11/2002 | Borkar et al. | 713/324 |
| 6,820,209 | B1 * | 11/2004 | Culbert et al. | 713/501 |
| 6,889,332 | B2 * | 5/2005 | Helms et al. | 713/322 |
| 6,963,992 | B1 * | 11/2005 | Cheng et al. | 713/501 |
| 2002/0029352 | A1 | 3/2002 | Borkar et al. | |
| 2003/0110423 | A1 | 6/2003 | Helms et al. | |
| 2003/0229816 | A1 * | 12/2003 | Meynard | 713/600 |
| 2004/0088593 | A1 * | 5/2004 | Park | 713/322 |

OTHER PUBLICATIONS

European Search Report from European Patent Office for European Application No. EP04255060, dated Jun. 30, 2006, pp. 1-3.
Sofia, Dr. John W.; Electrical temperature measurement using semiconductors; from electronics-cooling.com; Jul. 1, 1998; pp. 1-3.
Condra, Lloyd; Junction Temperature Considerations in Evaluating Electronic Parts for Use Outside Manufacturers Specified Temperature Ranges; IEEE Transactions on Components and Packaging Technologies; vol. 24, No. 4; Dec. 2001; pp. 721-728.

* cited by examiner

*Primary Examiner*—Rehana Perveen
*Assistant Examiner*—Eric Chang
(74) *Attorney, Agent, or Firm*—Vedder Price P.C.

(57) ABSTRACT

An adaptive temperature dependent clock feedback control system and method for adaptively varying a frequency of a clock signal to a circuit such that the circuit may operate at a maximum safe operating clock frequency based on a circuit junction temperature. The clock control system includes a thermal sensor and a temperature dependent dynamic overclock generator circuit. The thermal sensor detects a junction temperature corresponding to at least a portion of the circuit on a semiconductor die. The temperature dependent dynamic overclock generator circuit varies the clock signal based on the semiconductor die junction temperature, such that the clock signal operates at the highest possible operating frequency associated with the detected junction temperature. The frequency of the clock signal is increased from a first frequency to at least a second frequency and a third frequency if the junction temperature is below a lower junction temperature threshold.

14 Claims, 6 Drawing Sheets

ADAPTIVE TEMPERATURE DEPENDENT FEEDBACK CLOCK CONTROL SYSTEM AND METHOD

FIELD OF THE INVENTION

The invention relates generally to processor systems and, more particularly, to clock control circuits for processor systems.

BACKGROUND OF THE INVENTION

A computer system, and other processor based systems, are known to include a central processing unit, video graphics circuitry, system memory, and other peripheral circuits. In such systems, the central processing unit functions as a host processor while the video graphics circuitry (e.g., a graphics co-processor) functions as a loosely coupled co-processor. By way of example, the video graphics circuitry may be an integrated circuit on a single semiconductor die, such as an application specific integrated circuit (ASIC). Additionally, the video graphics circuitry may include memory, such as, but not limited to, dynamic ram (DRAM). This memory may reside on the same semiconductor die (ASIC) as the video graphics circuitry or it may be separate and connected through board level or package level traces.

In conventional computer systems, a clock generator circuit, such as a phase lock loop (PLL) circuit generates a clock signal for the video graphics circuitry. As is known in the art, each device, such as the video graphics circuitry and the memory, may also include individual phase lock loop circuits for generating a respective clock signal. In these conventional computer systems, the frequency of the clock signal for the computer system is set at a maximum operating clock frequency to ensure suitable computer system performance at the maximum rated operating temperature. Manufacturers establish a nominal clock frequency of the computer system, such as the video graphics circuitry, via a qualification process. According to the qualification process, the maximum operating clock frequency is established based on the video graphics circuitry operating at a maximum junction temperature. As a result, the nominal operating frequency of the clock signal is established based on a worst case operating condition of a maximum junction temperature. The maximum operating junction temperature may be determined by detecting the junction temperature or, alternatively, by detecting the case or package temperature and calculating the junction temperature based on heat transfer equations as is known in the art. Accordingly, junction temperature, as used herein, may also include case temperature.

The nominal operating frequency is established at the maximum junction temperature based on the signal propagation and timing requirements of the individual circuits within the video graphics circuitry, and the ability of the video graphics circuitry chip to dissipate heat, such as through a heat sink. The power dissipation characteristics of the video graphics circuitry and other integrated circuits are typically related to the operating frequency of the corresponding clock signal. As the operating frequency of the clock signal increases, the video graphics circuitry tends to generate more heat. As a result, the junction temperature generally increases as the clock frequency increases. Consequently, as the junction temperature increases, in order to ensure proper operation of the video graphics circuitry, the highest possible clock frequency permissible while decreases.

According to one method, the video graphics circuitry is shut down if the junction temperature on the video graphics circuitry exceeds the maximum junction temperature permitted for proper operation of the video graphics circuitry. However, such a method is limited to a safety mechanism for preventing the junction temperature from exceeding the maximum established junction temperature that may otherwise cause permanent damage to the video graphics circuitry. For example, if a cooling fan coupled to the video graphics circuitry fails or if a heat sink to the video graphics circuitry falls off, the video graphics circuitry may be shut down to prevent permanent damage to the video graphics circuitry.

According to another method, the clock frequency of the video graphics circuit, and other integrated circuits, has a fixed frequency clock that can be manually changed by the user through a graphical user interface. Nevertheless, the clock frequency is typically factory set upon initialization and often does not change. However, since the clock generation circuit is typically a phase lock loop, when the user manually changes the clock speed, such as during BIOS setup, a phase lock loop in a clock generator circuit is reprogrammed. Reprogramming of the phase lock loop may result in abruptly changing the clock speed. Such an abrupt change in clock speed may also result in the video graphics circuitry causing an undesired flicker in a resulting video graphics display. Accordingly, such a change in clock speed may only occur during manual setup, such as during BIOS setup, and not dynamically during graphics processing.

BRIEF DESCRIPTION OF THE DRAWINGS

The present invention is illustrated by way of example and not limitation in the accompanying figures, in which like reference numerals indicate similar elements and in which.

DETAILED DESCRIPTION OF THE PREFERRED EMBODIMENTS

An adaptive temperature dependent feedback clock control system and method for adaptively varying a frequency of a clock signal to a circuit such that the circuit may operate at a maximum safe operating clock frequency based on a circuit junction temperature. The circuit may be a host processor, a co-processor, such as a graphics co-processor, a memory, or any suitable device for receiving the clock signal. The adaptive temperature dependent feedback clock control system, herein referred to as a clock control system includes a thermal sensor and a temperature dependent dynamic overclock generator circuit. The thermal sensor detects a junction temperature corresponding to at least a portion of the circuit on a semiconductor die. The clock control system adapts the frequency of the clock signal according to the junction temperature by monitoring the circuit junction temperature via the thermal sensor to form a feedback loop. According to one embodiment, the frequency of the clock signal is increased from a first frequency to at least one of a second and a third frequency if the junction temperature is below a first junction temperature threshold.

The clock control system provides a clock signal at a frequency that is higher than a nominal operating clock frequency corresponding to a maximum rated junction temperature. As used herein, overclocking refers to providing a clock signal at an operating frequency that is higher than the nominal operating clock frequency, if the detected junction temperature is less than the maximum rated junction temperature. Accordingly, the temperature dependent dynamic overclock generator circuit varies the frequency of the clock signal based on the semiconductor die junction temperature, such that the clock signal operates at the highest possible operating frequency associated with the detected junction temperature.

Among other advantages, the present invention allows the circuit, such as a graphics processor, to operate at a highest possible safe clock frequency permitted based on the detected junction temperature. Since a circuit typically operates at a junction temperature that is less than the maximum rated operating junction temperature, the operating clock frequency may be increased above the maximum rated operating clock frequency associated with the maximum rated junction temperature. The detected junction temperature will then be used as a feedback signal to determine a safe operating clock rate associated with the current circuit junction temperature. Accordingly, the clock control system may increase or decrease the clock rate, according to the current junction temperature. As a result, the circuit may operate as fast as possible within a desired safety margin. Consequently, the performance of the circuit may increase, further increasing the performance of the computer system. For example, as the junction temperature decreases, the clock frequency of the circuit may increase, thus increasing performance. Additionally, the clock control system may provide a performance increase greater than that available with current fixed clock rate systems. The operating clock frequency will always be greater than or equal to the maximum clock frequency associated with the maximum junction temperature, unless the junction temperature exceeds the maximum rated junction temperature. Further, if the junction temperature approaches or exceeds the maximum junction temperature, then the clock signal frequency may be further reduced and a supply voltage to the circuit may be reduced in order to avoid damage to the circuit by, for example, a thermal runaway condition.

Figure 1:
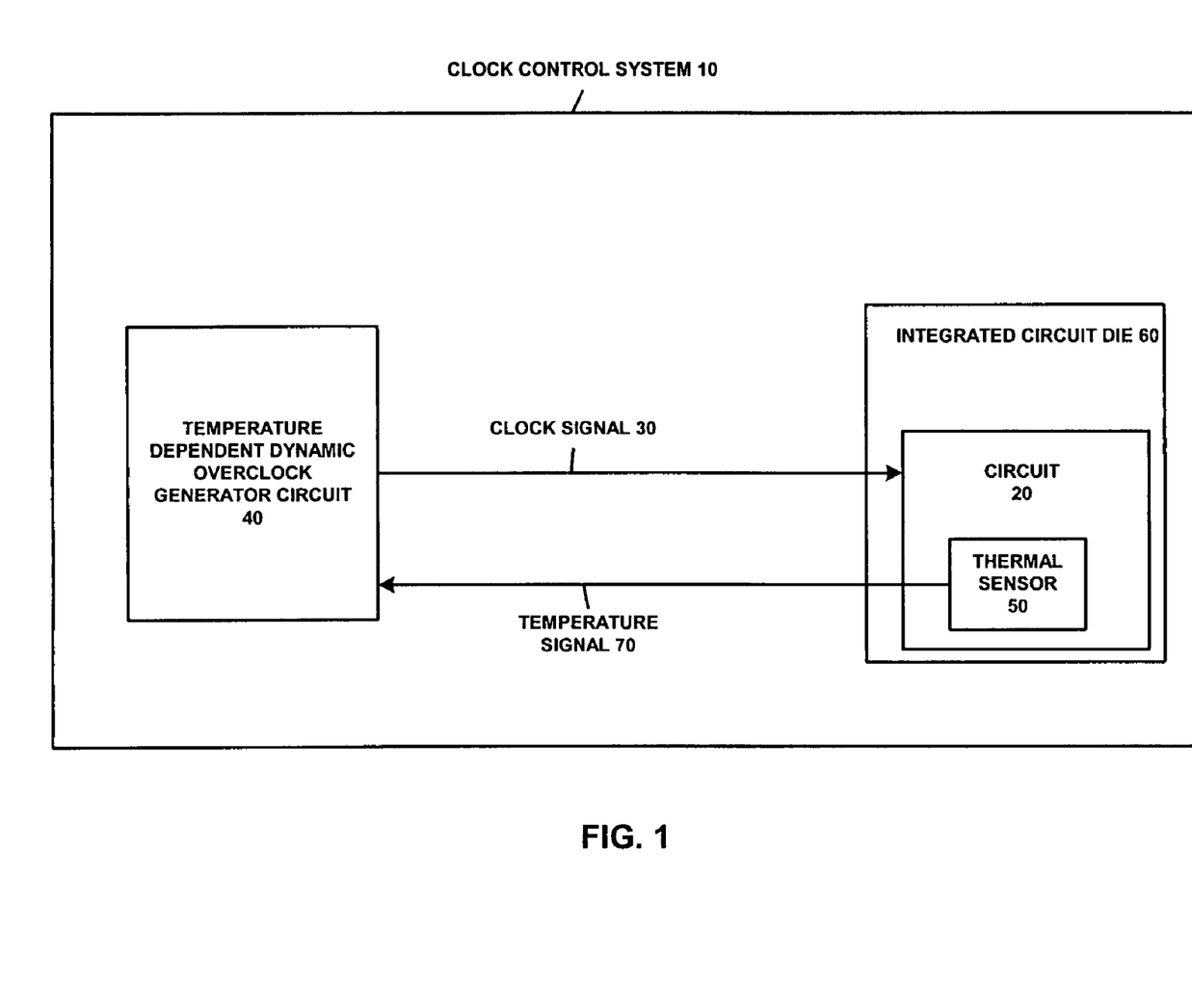
FIG. 1 is a block diagram illustrating one example of a clock control system in accordance with one exemplary embodiment of the invention.

FIG. 1 is a block diagram of a clock control system 10 to permit circuit 20 to operate at a maximum possible clock signal 30 based on at least a detected junction temperature. The clock control system 10 includes a circuit 20 for receiving the clock signal 30, a temperature dependent dynamic overclock generator circuit 40 and a thermal sensor 50. As used herein, circuit 20 includes a host processor, a microprocessor, a graphics co-processor, a memory, or any other suitable device for receiving a clock signal 30. The thermal sensor 50 is coupled to detect a junction temperature corresponding to at least a portion of the circuit 20 included in an integrated circuit die 60.

The temperature dependent dynamic overclock generator circuit 40 may be one or more suitably programmed processors, such as a microprocessor, a microcontroller, or a digital signal processor and, therefore, includes associated memory that contains executed instructions that when executed cause the temperature dependent dynamic overclock generator circuit 40 to carry out the operations described herein. In addition, the temperature dependent dynamic overclock generator circuit 40, as used herein, includes discrete logic, state machines or any other suitable combination of hardware, software and/or firmware.

According to one embodiment, the thermal sensor 50 is a temperature sensitive diode such that a current through the diode depends on the temperature of the diode. Alternatively, the thermal sensor 50 may be a thermistor, or any suitable device for sensing the junction temperature of at least a portion of circuit 20. The temperature dependent dynamic overclock generator circuit 40 may sense the voltage or a current operating through the thermal sensor 50. Accordingly, as the temperature of the circuit 20 increases, heat transfers to the thermal sensor 50 thereby changing the current through the thermal sensor 50. The thermal sensor 50 may be located on any portion of circuit 20 or on any portion of the integrated circuit die 60 suitable to detect the junction temperature of any portion of the circuit 20. According to one embodiment, the thermal sensor 50 is located in a middle portion of the integrated circuit die 60.

The integrated circuit die 60 may be an application-specific integrated circuit (ASIC), as is known in the art. According to another embodiment, the thermal sensor 50 is located external to the integrated circuit die 60. According to yet another alternative embodiment, the thermal sensor 50 may be located on a heat sink coupled to a package of the integrated circuit die 60. Furthermore, the thermal sensor 50 may be located on a circuit board including the integrated circuit die 60. Accordingly, the junction temperature of the integrated circuit die 60 may be derived based on formulas related to a heat transfer of integrated circuits, as is well known in the art.

The temperature dependent dynamic overclock generator circuit 40 is coupled to the thermal sensor 50 to receive a temperature signal 70. The temperature dependent dynamic overclock generator circuit 40 produces the clock signal 30 in response to detecting the temperature signal 70 corresponding to the junction temperature on at least the portion of the circuit 20 on integrated circuit die 60. The temperature dependent dynamic overclock generator circuit 40 varies the clock signal 30 based on the detected temperature signal 70. For example, if the clock signal 30 is operating at a first frequency associated with a first junction temperature, and the first junction temperature is less than the maximum rated junction temperature corresponding to the nominal operating frequency, then the operating frequency of the clock signal 30 may be increased above the nominal operating frequency.

Figure 2:
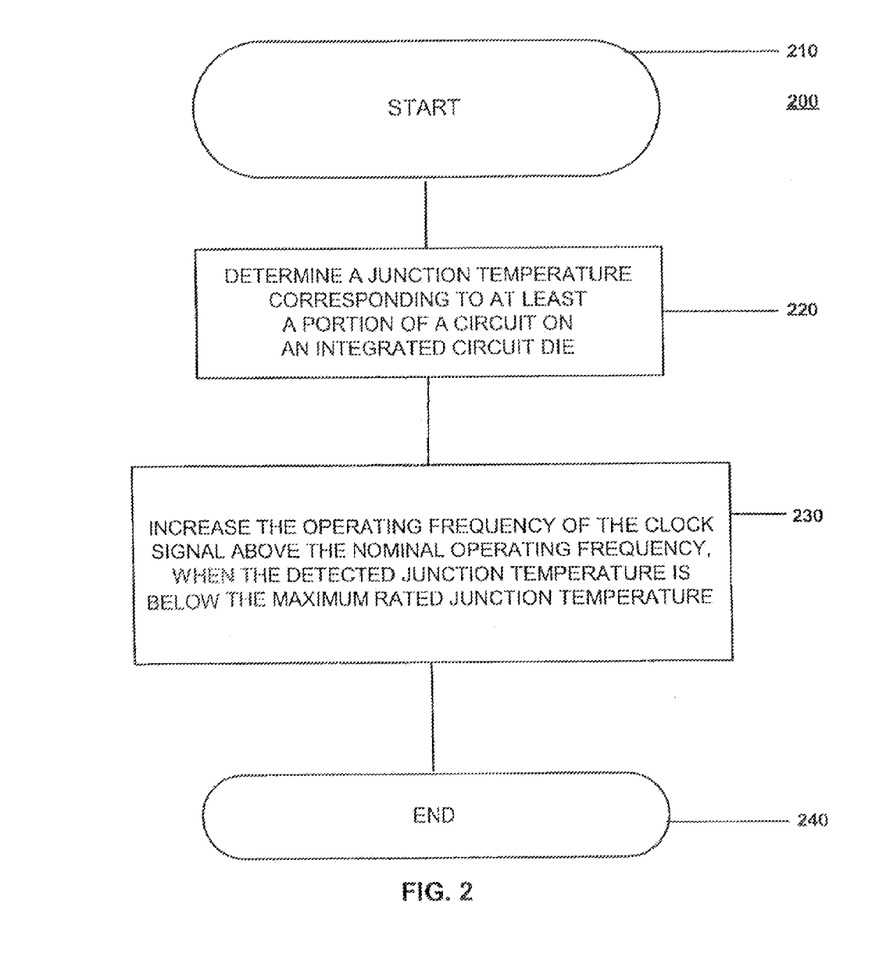
FIG. 2 is a flow chart illustrating one example of a method for generating a clock signal according to one exemplary embodiment of the invention.

FIG. 2 illustrates a method 200 for generating the clock signal 30 in accordance with one exemplary embodiment of the invention. The method 200 may be carried out by the clock control system 10. However, any other suitable structure may also be used. It will be recognized that method 200, beginning with step 210, will be described as a series of operations, but the operations may be performed in any suitable order and may be repeated in any suitable combination.

As shown in step 220, the thermal sensor 50 detects a junction temperature corresponding to at least a portion of the circuit 20 on the integrated circuit die 60. Accordingly, the temperature dependent dynamic overclock generator circuit 40 receives the temperature signal 70 from thermal sensor 50 corresponding to the junction temperature associated with at least the portion of the circuit 20 on the integrated circuit die 60.

As shown in step 230, the temperature dependent dynamic overclock generator circuit 40 increases an operating frequency of the clock signal 30 above the nominal operating frequency associated with a maximum junction temperature in response to determining that the junction temperature is below the maximum rated junction temperature for the integrated circuit die 60. As previously stated above, since during normal operating conditions the junction temperature is typically much lower than the maximum rated junction temperature, the clock frequency may be increased above the nominal operating frequency safely without causing any damage to circuit 20. Accordingly, the temperature dependent frequency clock generator circuit 40 may increase the frequency of a clock signal 30 from a first frequency corresponding to a first junction temperature to at least one of a second frequency corresponding to a second junction temperature and a third frequency corresponding to a third junction temperature, when the detected junction temperature is less than at least one of: the second junction temperature and the third junction temperature, such that second junction temperature and the third junction temperature is less than the maximum rated junction temperature.

Figure 3:
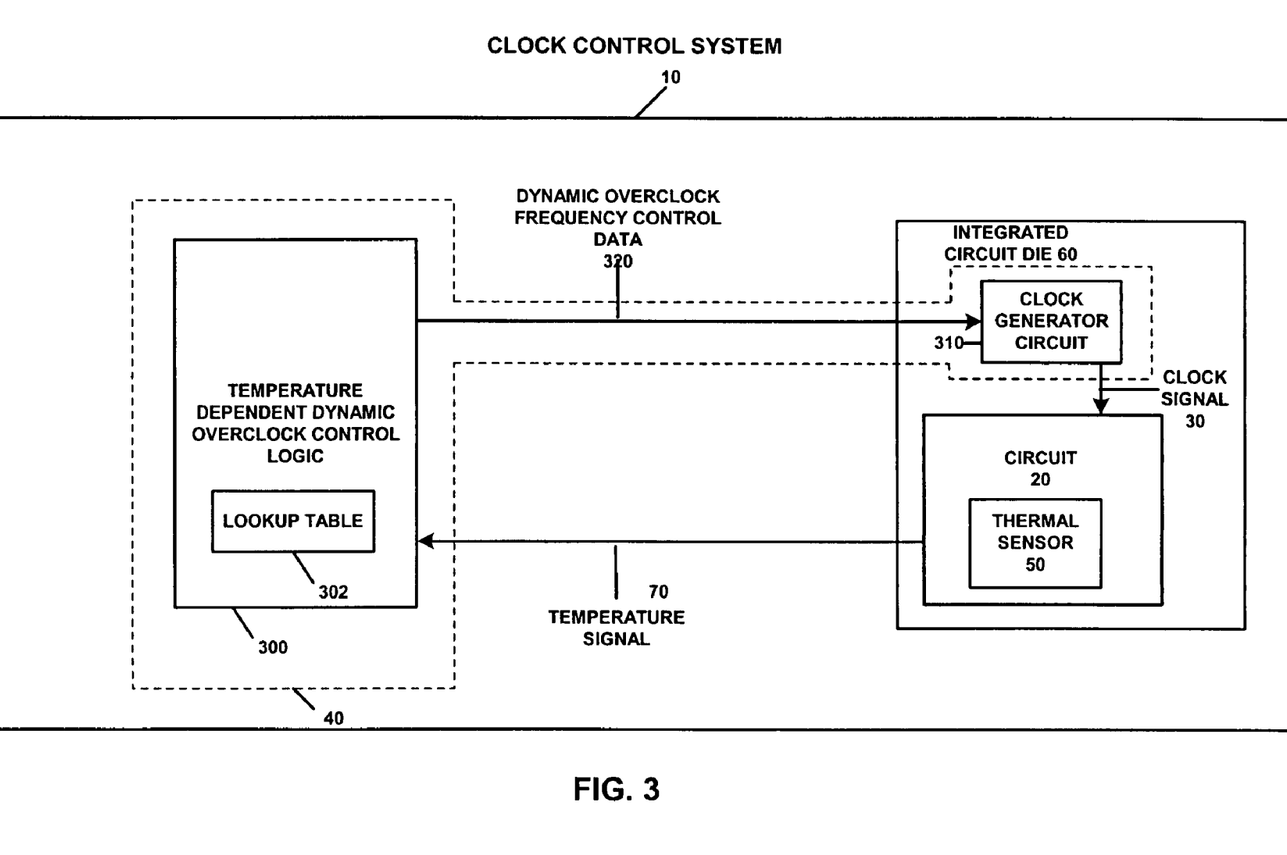
FIG. 3 is a block diagram illustrating another example of the clock control system in accordance with another exemplary embodiment of the invention.

FIG. 3 is a block diagram illustrating another example of the clock control system 10 in accordance with another exemplary embodiment of the invention. According to this embodiment, the temperature dependent dynamic overclock generator circuit 40 includes temperature dependent dynamic overclock control logic 300 and a clock generator circuit 310. The temperature dependent dynamic overclock control logic 300 may be one or more suitably programmed processor, such as a microprocessor, a microcontroller, or a digital signal processor, and, therefore, includes associated memory that contains executable instructions that, when executed, cause the temperature dependent dynamic overclock control logic 300 to carry out the operations described herein. In addition, the temperature dependent dynamic overclock control logic 300, as used herein, includes discrete logic, state machines or any other suitable combination of hardware, software and/or firmware. According to one embodiment, the temperature dependent dynamic overclock control logic 300 includes a host processor, and the circuit 20 is a graphics coprocessor.

The various elements of the clock control system 10 are linked by plurality of links. The links may be any suitable mechanisms for conveying electrical signals or data, as appropriate. For example, the interface between the temperature dependent dynamic overclock control logic 300 and the clock generator circuit 310 for carrying the dynamic overclock frequency control data 320 may be a host processor to graphics coprocessor interface, such as a PCI bus, an AGP, a PCI-express bus, an I$^2$C (IC to IC) bus or any other type of bus either standardized or proprietary.

The clock generator circuit 310 may be a phase lock loop circuit, including a divider register, as is known in the art, for producing the clock signal 30 in response to receiving the dynamic overclock frequency control data 320 from the temperature dependent dynamic overclock control logic 300. For example, the divider register controls the frequency of clock signal 30, as is known in the art.

The temperature dependent dynamic overclock control logic 300 is coupled to the thermal sensor 50 to receive the temperature signal 70 in order to determine a corresponding clock frequency. The temperature dependent dynamic overclock control logic 300 produces the dynamic overclock frequency control data 320 to cause the clock generator circuit 310 to produce the clock signal 30 at a first frequency associated with a first junction temperature such as a nominal operating clock frequency associated with a maximum operating temperature. The temperature dependent dynamic overclock control logic 300 provides the dynamic overclock frequency control data 320 to the clock generator circuit 310. Clock generator circuit 310 produces the clock signal 30 at a second frequency, such that the second frequency of the clock signal 30 is greater than the first frequency of the clock signal 30 corresponding to the first junction temperature, when the second junction temperature is less than the first junction temperature.

According to one embodiment, the temperature dependent dynamic overclock control logic 300 contains the lookup table 302, containing an array of junction temperatures over a temperature operating range along with corresponding clock signal frequencies. According to one embodiment, the lookup table 302 has as an input the current junction temperature. Accordingly, the lookup table 302 has as an output a corresponding operating frequency for the clock signal 30.

According to another embodiment, the data for the lookup table 302 may be determined by a qualification testing procedure. The qualification testing procedure of the circuit 20 may entail running the circuit 20 in a thermal chamber at a number of specified junction temperatures. The testing procedure may adjust the junction temperature of the integrated circuit die 60 while the frequency of the clock signal 30 is increased until the maximum frequency of the clock signal is determined for a particular junction temperature. During the qualification testing procedure, the frequency of the clock signal 30 is increased until the circuit 20 ceases to function properly. For example, the circuit 20 may cease to function as a result of propagation delays within circuit 20 that violate boundary conditions, as is known in the art. This procedure is then repeated on several video graphics processing integrated circuits at various junction temperatures and the resulting data is logged. Once all of the data is collected, a maximum safe operating speed for each temperature within the temperature operating range, for example from −25° C. to +125° C., is determined. Additionally, the test data may be processed through an equation that takes into account the probability of failure associated with running the circuit 20 at different operating frequencies.

Multiple intermediate operating frequency ranges for the clock signal 30 may be included in the lookup table 302 so that the junction temperature varies in steps or ranges from, for example, an junction temperature of 0° C. up to a maximum junction temperature of 155° C. Accordingly, the table may provide corresponding operating frequencies for the clock signal 30 and an appropriate number of steps or ranges, having a range size of 5° C., 10° C., 25° C. or any suitable range size. According to an alternative embodiment, the temperature dependent dynamic overclock generator circuit 40 may be programmed with a formula or algorithm to calculate the appropriate operating frequency of the clock signal 30 in response to detecting the junction temperature.

Additionally, the lookup table 302 may be developed to accommodate typical production performance variations in the circuit 20. Accordingly, the lookup table 302 may compensate for performance variations by increasing or decreasing the clock frequency based on the detected junction temperature measurements. As previously described, the qualification procedure known in the art tests a circuit 20 to determine its maximum operating performance at a maximum junction temperature. However, due to a variety of environmental and other factors encountered during the fabrication of integrated circuits, the circuit 20 may exhibit a wide variation of performance among any given sample of integrated circuits. As a result, the lookup table 302 may include data to accommodate different levels of performance.

Increasing the number of ranges provided in the lookup table 302 will result in better control of the junction temperature of the circuit 20. However, a relatively few number of ranges may be implemented in order to simplify the clock control system 10. The ranges may be spread out in a linear fashion or in any appropriate manner, such as in a logarithmic or exponential manner. According to one embodiment, different lookup tables may be provided in order to accommodate differences in physical installation, such as different heat sinks that may be used on circuit 20.

The temperature dependent frequency clock generator circuit 40 increases the frequency of the clock signal 30 if the current junction temperature is below a junction temperature threshold level such as the maximum junction temperature threshold. Conversely, the temperature dependent dynamic overclock generator circuit 40 decreases the frequency of the clock signal 30 if the junction temperature is above a junction temperature threshold such as the maximum junction temperature threshold. The junction temperature threshold for determining if the frequency of the clock signal 30 should be decreased, and the junction temperature threshold for determining if the frequency of the clock signal 30 should be increased may be two different threshold levels. For example, an upper threshold level and a lower threshold level may be established in order to prevent or reduce oscillations causing the frequent changing of the frequency of clock signal 30. Such a mechanism for incorporating an upper temperature threshold and a lower junction temperature threshold is known as a hysteresis mechanism, as is known in the art. Accordingly, the temperature dependent frequency clock generator circuit 40 provides hysteresis based frequency control in order to prevent or reduce oscillations causing the frequent changing of the frequency of clock signal 30.

According to another embodiment, the temperature dependent dynamic overclock generator circuit 40 determines the processing load on the circuit 20 in order to decide if an increase in the frequency for clock signal 30 is useful or necessary. Accordingly, if there is no load, or a relatively light load, then there is no need to increase the clock signal 30, even though the junction temperature of circuit 20 is relatively low. For example, if the graphics processor has a relatively light processing load or is idle because a graphics display is blank or does not change, then the clock frequency may be decreased to reduce heat dissipation and power consumption. However, if the processing load increases, then the frequency of the clock signal 30 may be increased in order to meet the processing load requirements on the circuit 20.

According to another embodiment, the lookup table 302 within the temperature dependent dynamic overclock generator circuit 40 contains entries that include a safety margin in order to avoid damaging the circuit 20 or exposing the circuit 20 to a thermal runaway condition. Based on trial and error experiments during qualification testing, the frequency of the clock signal 30 may be increased such that the resulting junction temperature on circuit 20 will not result in an increase in the junction temperature over time resulting in a thermal runaway condition. For example, since increasing the frequency of clock signal 30 generally corresponds to an increase in junction temperature on circuit 20, the increase in temperature is a result of the increased generation of heat. Therefore, as the circuit 20 generates more heat, the ability of a heat sink to dissipate that heat ultimately affects the junction temperature of circuit 20. If the circuit 20 generates more heat than the heat sink can dissipate, then the junction temperature will begin to increase over time, causing a condition known as thermal runaway. Accordingly, the lookup table 302 or an algorithm executed on the temperature dependent dynamic overclock generator circuit 40 increases the frequency of clock signal 30 such that circuit 20 does not encounter a thermal runaway condition. As a result of the safety margin built into the lookup table 302, the frequency of the clock signal 30 may be increased conservatively in order to provide a safety margin to avoid exposing the circuit 20 to the maximum rated junction temperature and to avoid a thermal runaway condition.

If a particular application requires increasing the processing load on circuit 20, then the temperature dependent dynamic overclock generator circuit 40 may temporarily reduce the safety margin and apply a more aggressive approach to increasing the frequency of clock signal 30. For example, if the increase in processing requirements is limited to a short period of time, then the junction temperature may be allowed to increase, knowing that the frequency of the clock signal 30 will be reduced shortly thereafter to allow a reduction in the junction temperature.

Nevertheless, the lookup table 302 for the temperature dependent dynamic overclock generator circuit 40 may be developed with a safety margin such that a race condition or a violation of the boundary conditions is avoided as is known in the art. In the event the boundary condition is violated, data within circuit 20 may be corrupted and may affect subsequent processing instructions. As is known in the art, an adequate setup time for each data path in circuit 20 is required for the internal processing of circuit 20 in order to assure that data is stable for subsequent processing steps. Accordingly, the safety margin established within the lookup table 302 may include an adequate amount of setup time within the boundary conditions for a variety of operating frequencies and junction temperature ranges.

In the event that increasing the frequency of the clock signal 30 above the maximum clock frequency corresponding to a maximum junction temperature causes the junction temperature to approach the maximum junction temperature, the temperature dependent dynamic overclock generator circuit 40 may reduce the frequency of the clock signal 30 to either reduce the junction temperature, or to prevent the junction temperature from further increasing. If the junction temperature continues to increase even if the frequency of the clock signal 30 is reduced, then more drastic measures, such as further reducing the frequency of the clock signal 30 and reducing the supply voltage to prevent permanent damage of the circuit 20 may be employed.

According to another embodiment, the frequency of the clock signal 30 may be adjusted over a transition time period such that, as the frequency of the clock signal 30 changes from one frequency to another, the frequency of the clock signal 30 includes intermediate frequencies. For example, the temperature dependent variable frequency clock generator circuit 40 may include a phase lock loop circuit in order to provide a desired frequency for clock signal 30. As is known in the art, a phase lock loop circuit may provide a variable frequency for the clock signal 30 through the use of a variable feedback divider circuit. Accordingly, the frequency of the clock signal 30 may be varied by loading an appropriate value for the feedback divider circuit. As a result, the frequency of the clock signal 30 may be dynamically changed. According to one embodiment, the feedback divider circuit is a fractional divider to provide the ability to produce a desired frequency for clock signal 30. Accordingly, the frequency of the clock signal 30 may be changed in small steps to produce the intermediate frequencies in order to ensure that the circuit 20 does not experience a discontinuity in processing. Additionally, the feedback divider can be controlled such that changes in the frequency of the clock signal 30 occur without a major disruption in the clock signal 30.

Controlling the frequency of the clock signal 30 by changing the divisor in the feedback divider allows the clock control system 10 to quickly react to reduce the clock frequency in the event the junction temperature begins to rise quickly. However, as previously described, if a slower, more gradual transition from one frequency to another is desired, such as when increasing the clock frequency, then the phase lock loop circuit may change the frequency over a longer period of time, or stepped as required. Additionally, the phase lock loop circuit may change the frequency of the clock signal 30 without stopping the clock signal 30, thereby avoiding any disruptions in the processing occurring in the circuit 20. According to one embodiment, the circuit 20 is a graphics processor, such that the avoidance of any disruptions in processing avoids freezing of display images and also avoids jerkiness in motion on the display image.

Figure 4:
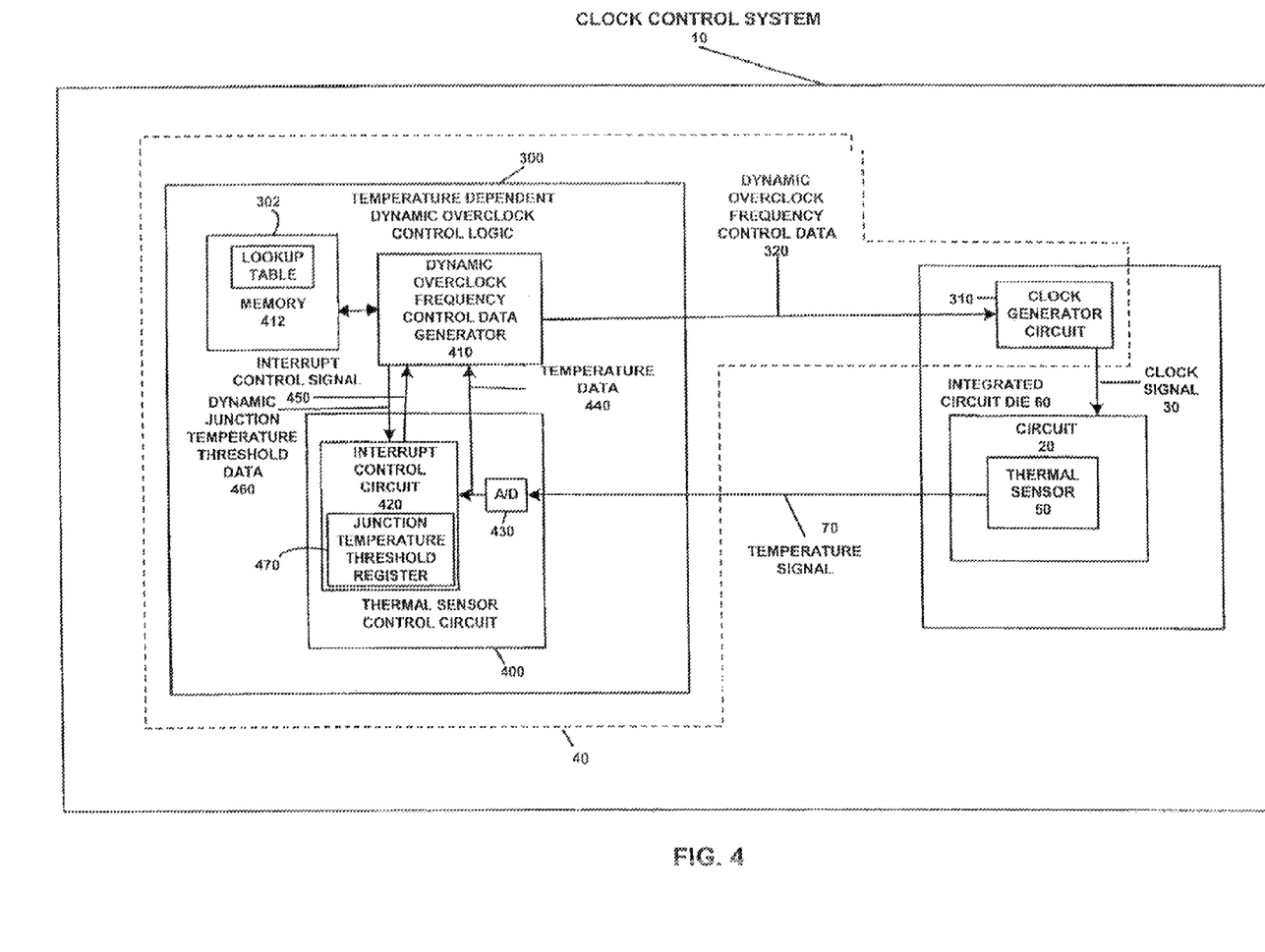
FIG. 4 is a block diagram illustrating yet another example of the clock control system in accordance with another exemplary embodiment of the invention.

FIG. 4 illustrates another embodiment of the clock control system 10 in accordance with another exemplary embodiment of the invention. According to this embodiment, the temperature dependent dynamic overclock control logic 300 includes a thermal sensor control circuit 400, a dynamic overclock frequency control data generator 410 and a memory 412. The thermal sensor control circuit 400 includes an interrupt control circuit 420 and an A/D converter 430. The thermal sensor control circuit 400 produces temperature data 440 in response to the temperature signal 70. For example, the thermal sensor control circuit 400 may convert a voltage or current corresponding to the temperature signal 70 into the temperature data 440 via the A/D converter 430. The dynamic overclock frequency control data generator 410 is coupled to the thermal sensor control circuit 400 to produce the dynamic overclock frequency control data 320 in response to the temperature data 440. The memory 412 may include the lookup table 302, an algorithm, or any suitable formula in order to produce the appropriate dynamic overclock frequency control data 320 in response to receiving the temperature data 440.

The various elements of the thermal sensor control circuit 400 are linked by a plurality of links. The links may be any suitable mechanisms for conveying electrical signals or data as appropriate and as previously described. The dynamic overclock frequency control data generator 410 may be one or more suitably programmed microprocessors, such as a microprocessor, a microcontroller or a digital signal processor, and, therefore, includes associated memory, such as memory 412, that contains executable instructions that, when executed, causes the dynamic overclock frequency control data generator 410 to carry out the operations described herein. Although the thermal sensor control circuit 400 is shown external to the integrated circuit die 60, the thermal sensor control circuit 400 may be integrated into the integrated circuit die 60. According to one embodiment, the thermal sensor control circuit 400 may be a device, as is currently used in the art as a safety failure mechanism, in order to turn off the circuit 20, such as a graphics processor, in the event the junction temperature approaches or exceeds the maximum junction temperature. For example, the thermal sensor control circuit 400 may be an integrated circuit produced by ATI Inc. having a part number 5961215. Although the A/D converter 430 is included in the thermal sensor control circuit 400, the A/D converter 430 may be integrated into the integrated circuit die 60.

The interrupt control circuit 420 receives the temperature data 440 from the A/D converter 430 to produce an interrupt control signal 450 in response to receiving the temperature data 440. For example, the interrupt control circuit 420 may program a predetermined junction temperature threshold register 470 with dynamic junction temperature threshold data 460 such that, if the received temperature data 440 exceeds the dynamic junction temperature threshold data 460, the interrupt control circuit 420 provides the interrupt control signal 450 to the dynamic overclock frequency control data generator 410. In response to the interrupt control signal 450, the dynamic overclock frequency control data generator 410 then obtains the current junction temperature of the integrated circuit die 60 via reading the temperature data 440. According to one embodiment, dynamic overclock frequency control data generator 410 may reprogram a new junction temperature threshold in the interrupt control circuit 420 for producing the interrupt control signal 450. Accordingly, the temperature dependent frequency clock generator circuit 40 provides hysteresis based frequency control at each operating frequency of clock signal 30 in order to prevent or reduce oscillations otherwise causing the frequent changing of the frequency of clock signal 30.

According to one embodiment, the dynamic overclock frequency control data generator 410 is a general purpose host processor capable of receiving a variety of interrupt control signals, such as the interrupt control signal 450 from the interrupt control circuit 420. Accordingly, the dynamic overclock frequency control data generator 410 may include an interface for receiving interrupt control signals, such as the interrupt control signal 450 via a general purpose input output (GPIO) interface, as is well known in the art.

Figure 5:
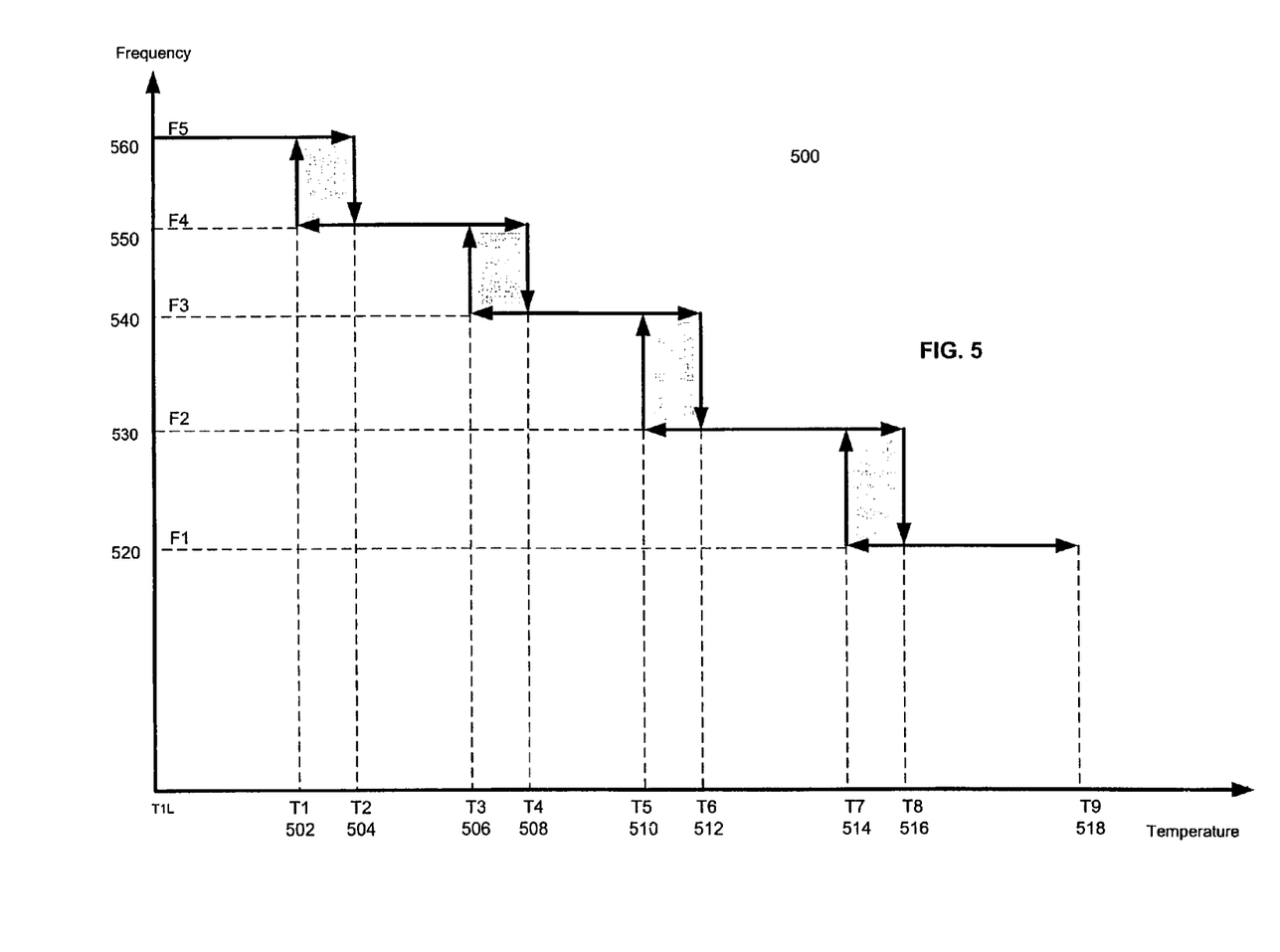
FIG. 5 is a graph illustrating one example of hysteresis based frequency control in accordance with one exemplary embodiment of the invention.

FIG. 5 is a graph illustrating one example of hysteresis based frequency control in accordance with one exemplary embodiment of the invention. As the junction temperature begins to increase, the interrupt control circuit 420 may be reset to such that the dynamic junction temperature threshold data 460 programmed into the junction temperature threshold register 470 is replaced with new dynamic junction temperature threshold data 460 in order to adapt the frequency of the clock signal 30 to the junction temperature on the integrated circuit die 60. For example, as the temperature increases from T4 508 to T6 512, the dynamic junction temperature threshold data 460 decreases from T4 508 to new dynamic junction temperature threshold data 460 corresponding to T6 512. Accordingly, the frequency of the clock signal 30 decreases from F3 540 to F2 530. However, if the junction temperature on the integrated circuit die 60 is decreasing, then the dynamic threshold junction temperature data 460 programmed into the interrupt control circuit 420 may be decreased accordingly. If the temperature decreases from T5 510 to T3 506, then the junction temperature threshold data 460 decreases from T5 510 to new dynamic junction temperature threshold data 460 corresponding to T3 506 and the clock frequency increases from F2 530 to F3 540.

Alternatively, dynamic overclock frequency control data generator 410 may poll the A/D converter 430 for temperature data 440 periodically, or during any suitable non-periodic or periodic period of time, in order to monitor the temperature data 440 corresponding to the junction temperature of the integrated circuit die 60. The dynamic overclock frequency control data generator 410 may also monitor, for example, the rate of change of the junction temperature, and also the rate of heat dissipation.

When the dynamic overclock frequency control data generator 410 is initially booted during initialization, the dynamic overclock frequency control data generator 410 may read the initial temperature data 440 corresponding to the junction temperature and then program the junction temperature threshold register 470 with appropriate dynamic threshold junction temperature data 460 into the interrupt control circuit 420, such as, for example, an upper junction temperature threshold and a maximum junction temperature threshold. According to one embodiment, the dynamic overclock frequency control data generator 410 executes instructions contained in memory 412 that, when executed, cause the dynamic overclock frequency control data generator 410 to determine the target frequency of the clock signal 30 for a particular temperature range and for a particular processing load on the circuit 20, such as a graphics coprocessor. If the initial frequency of the clock signal 30 is not equal to the initial target frequency for clock signal 30, then the dynamic overclock frequency control data generator 410 may cause clock generator circuit 310 to ramp up the frequency of the clock signal 30 to the target frequency. As the frequency of the clock signal 30 increases, the interrupt control circuit 420 constantly monitors the junction temperature of the integrated circuit die 60. Should the junction temperature increase above the temperature level programmed as the upper dynamic junction temperature threshold data 460, then the interrupt control circuit 420 triggers the interrupt control signal 450. For example, the interrupt control signal 450 may generate a PCI interrupt on an accelerated graphics processor (AGP) bus. Accordingly, the dynamic overclock frequency control data generator 410 may reprogram the upper and lower dynamic junction temperature threshold data 460 in the junction temperature threshold register 470 for triggering the interrupt control signal 450.

According to one embodiment, the dynamic overclock frequency control data generator 410 executes software, such as a software driver operating on the host processor, for controlling the interrupt control circuit 420 and the clock generator circuit 310, as well as other circuits within circuit 20, as is known in the art. The software drivers may control the frequency of the clock signal 30, as previously described.

After the dynamic overclock frequency control data generator 410 has completed its initialization boot sequence and has programmed the initial dynamic junction temperature threshold data 460 into the interrupt control circuit 420, the interrupt control circuit 420 begins monitoring the junction temperature via the temperature data 440. If the junction temperature data 440 exceeds the programmed dynamic junction temperature threshold data 460, then the interrupt control circuit 420 provides an interrupt control signal 450 to the dynamic overclock frequency control data generator 410 to begin reducing the frequency of the clock signal 30. In order to provide a safety margin for preventing a thermal runaway condition on circuit 20, the dynamic junction temperature threshold data 460 programmed into the junction temperature threshold register 470 may be decreased. If the temperature data 440 is lower than the programmed dynamic junction temperature threshold data 460, then the dynamic overclock frequency control data generator 410 may cause the clock generator circuit 310 to increase the frequency of the clock signal 30, as described above. Once the processor establishes a new frequency for the clock signal 30, the dynamic overclock frequency control data generator 410 clears the interrupt control signal 45 and programs the appropriate dynamic junction temperature threshold data 460 into the interrupt control circuit 420.

Figure 6:
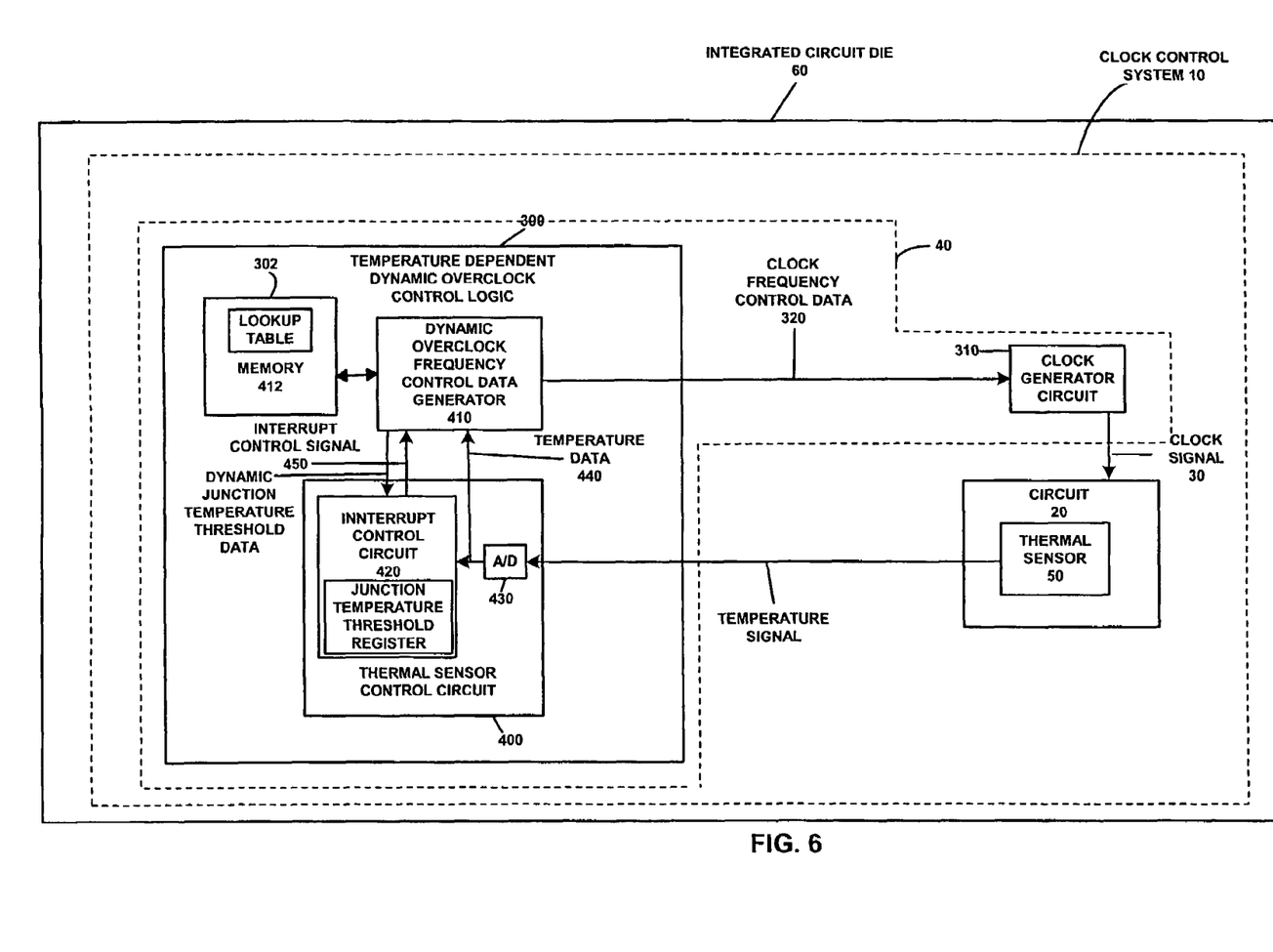
FIG. 6 is a block diagram illustrating an example of the clock control system on an integrated circuit die in accordance with one exemplary embodiment of the invention.

FIG. 6 is a block diagram illustrating one example of the clock control system 10 consolidated on an integrated circuit die 60. According to this embodiment, the temperature dependent dynamic overclock control logic 300 is included in integrated circuit die 60. According to one embodiment, the integrated circuit die 60 includes an application specific integrated circuit (ASIC) such that the clock control system 10 is a portion of the application specific integrated circuit.

Among other advantages, the present invention allows the circuit, such as a graphics processor, to operate at a highest possible safe clock frequency permitted based on the detected junction temperature. Since a circuit typically operates at a junction temperature that is less than the maximum rated operating junction temperature, the operating clock frequency may be increased above the maximum rated operating clock frequency associated with the maximum rated junction temperature. The clock control system adapts the frequency of the clock signal according to the junction temperature by monitoring the circuit junction temperature via the thermal sensor to form a feedback loop. The detected junction temperature will then be used as a feedback signal to determine a safe operating clock rate associated with the current circuit junction temperature. Accordingly, the clock control system may increase or decrease the clock rate, according to the current junction temperature. As a result, the circuit may operate as fast as possible within a desired safety margin. Consequently, the performance of the circuit may increase, further increasing the performance of the computer system. For example, as the junction temperature decreases, the clock frequency of the circuit may increase, thus increasing performance. Additionally, the clock control system may provide a performance increase greater than that available with current fixed clock rate systems. The operating clock frequency will always be greater than or equal to the maximum clock frequency associated with the maximum junction temperature, unless the junction temperature exceeds the maximum rated junction temperature. Further, if the junction temperature approaches or exceeds the maximum junction temperature, then the clock signal frequency may be further reduced and a supply voltage to the circuit may be reduced in order to avoid damage to the circuit by, for example, a thermal runaway condition.

It is understood that the implementation of other variations and modifications of the invention and its various aspects will be apparent to those of ordinary skill in the art and that the invention is not limited by the specific embodiments described. It is therefore contemplated to cover the present modifications, variations or equivalents that fall within the spirit and scope of the basic underlying principles disclosed and claimed herein.

The invention claimed is:

1. In a system comprising a host processor and a graphics co-processor, a method for generating a clock signal for the graphics co-processor, the clock signal having an operating frequency set to a nominal operating frequency corresponding to a maximum rated junction temperature, the method comprising:

detecting, by a thermal sensor coupled to the graphics co-processor, a junction temperature corresponding to at least a portion of a circuit on a die constituting at least a portion of the graphics co-processor, thereby providing a temperature signal;

providing, by a thermal sensor control circuit coupled to the thermal sensor, an interrupt control signal and temperature data in response to the temperature signal; and     causing, by the host processor coupled to the thermal sensor control circuit and in response to the interrupt control signal and the temperature data, an increase in the operating frequency of the clock signal above the nominal operating frequency, when the detected junction temperature is below the maximum rated junction temperature, wherein causing an increase in the operating frequency of the clock signal above the nominal operating frequency includes accessing memory comprising data representing junction temperatures over a temperature operating range with corresponding clock signal frequencies, wherein the data representing junction temperatures over a temperature operating range with corresponding clock signal frequencies are organized as at least one lookup table.

2. The method of claim 1 further including decreasing, by the host processor in response to the interrupt control signal, the operating frequency of the clock signal below the nominal operating frequency when the detected junction temperature is above the maximum rated junction temperature.

3. The method of claim 2 further including providing hysteresis based frequency control by:
   decreasing, by the host processor in response to the interrupt control signal, the operating frequency of the clock signal if the detected junction temperature is above an upper junction temperature threshold, and
   increasing, by the host processor in response to the interrupt control signal, the operating frequency of the clock signal if the detected junction temperature is below a lower junction temperature threshold wherein the upper junction temperature threshold is greater than the lower junction temperature threshold.

4. A clock control system for generating a clock signal having an operating frequency set to a nominal operating frequency corresponding to a maximum rated junction temperature, comprising:
   a thermal sensor operative to produce a temperature signal corresponding to a junction temperature of at least a portion of a circuit on a die;
   a thermal sensor control circuit, operatively coupled to the thermal sensor, and operative to produce temperature data in response to the temperature signal and to provide an interrupt control signal in response to the temperature data;
   a clock generator circuit operative to produce the clock signal;
   a dynamic overclock frequency control data generator, operatively coupled to the thermal sensor control circuit and the clock generator circuit, and operative to provide dynamic overclock frequency control data to the clock generator circuit in response to the interrupt control signal and the received temperature data to cause the clock generator circuit to increase the operating frequency of the clock signal above the nominal operating frequency, when the detected junction temperature is less than the maximum rated junction temperature; and
   memory comprising data representing junction temperatures over a temperature operating range with corresponding clock signal frequencies, wherein the data representing junction temperatures over the temperature operating range with corresponding clock signal frequencies are organized as at least one lookup table.

5. The clock control system of claim 4 wherein the dynamic overclock frequency control data generator is operative, in response to the temperature data and the interrupt control signal, to provide hysteresis based frequency control by providing the dynamic overclock frequency control data to cause the clock generator to increase the operating frequency of the clock signal above the operating frequency if the detected junction temperature is below a lower junction temperature threshold, and to decrease operating frequency of the clock signal below the operating frequency if the detected junction temperature is above an upper junction temperature threshold, wherein the upper junction temperature threshold is greater than the lower junction temperature threshold.

6. The clock control system of claim 4, wherein the dynamic overclock frequency control data generator is further operative to provide dynamic overclock frequency control data to the clock generator circuit to the clock generator circuit in response to the temperature data and the interrupt control signal to cause the clock generator circuit to decrease the operating frequency of the clock signal below the nominal operating frequency, when the detected junction temperature is greater than the maximum rated junction temperature.

7. The clock control system of claim 4, wherein the thermal sensor control circuit is operative to produce the interrupt control signal in response to a comparison between the temperature data and threshold temperature data.

8. The clock control system of claim 4, wherein the data representing at least the clock signal frequencies account for a predetermined physical installation of the circuit on the die.

9. The clock control system of claim 4, wherein the data representing at least one of the junction temperatures and corresponding clock signal frequencies are based on a qualification testing procedure and further includes a safety margin to avoid a thermal runaway condition.

10. The clock control system of claim 4, wherein at least one of the dynamic overclock frequency control data generator and the thermal sensor control circuit is further operative to determine a processing load on the circuit on the die and to provide the dynamic overclock frequency control data to the clock generator circuit in response to the temperature data, the interrupt control signal and the processing load.

11. The clock control system of claim 4, wherein the dynamic overclock frequency control data further cause the clock generator circuit to reduce a supply voltage to at least the portion of the circuit on the die, when the detected temperature is greater than the maximum rated junction temperature.

12. A clock control system for generating a clock signal having an operating frequency set to a first frequency corresponding to a first junction temperature, comprising:
   a thermal sensor operative to detect a junction temperature corresponding to at least a portion of a circuit on a die;
   a temperature dependent dynamic overclock generator circuit, operatively coupled to the thermal sensor, and operative to increase the operating frequency of the clock signal above the nominal operating frequency, when the detected junction temperature is below the maximum rated junction temperature; and
   memory comprising data representing junction temperatures over a temperature operating range with corresponding clock signal frequencies, wherein the data representing junction temperatures over a temperature operating range with corresponding clock signal frequencies account for a predetermined physical installation of the circuit on the die, and are organized as at least one lookup table.

13. The clock control system according to claim 12, wherein the data representing at least one of the junction temperatures and the corresponding clock signal frequencies are based on a qualification testing procedure and further includes a safety margin to avoid a thermal runaway condition.

14. A clock control system for generating a clock signal having an operating frequency set to a first frequency corresponding to a first junction temperature, comprising:
   a temperature dependent dynamic overclock generator circuit operative to increase the operating frequency of the clock signal above the nominal operating frequency when a detected junction temperature is below the maximum rated junction temperature; and
   memory comprising data representing junction temperatures over a temperature operating range with corresponding clock signal frequencies, wherein the data representing junction temperatures over a temperature operating range with corresponding clock signal frequencies are organized as at least one lookup table.

* * * * *